(12) United States Patent
Edgeworth et al.

(10) Patent No.: US 10,328,910 B2
(45) Date of Patent: Jun. 25, 2019

(54) COLLAPSIBLE CHOCK ASSEMBLY

(71) Applicants: Aaron Edgeworth, Pageland, SC (US); Baron Edgeworth, Jefferson, SC (US)

(72) Inventors: Aaron Edgeworth, Pageland, SC (US); Baron Edgeworth, Jefferson, SC (US)

( * ) Notice: Subject to any disclaimer, the term of this patent is extended or adjusted under 35 U.S.C. 154(b) by 0 days.

(21) Appl. No.: 15/690,691

(22) Filed: Aug. 30, 2017

(65) Prior Publication Data

US 2019/0061708 A1    Feb. 28, 2019

(51) Int. Cl.
*B60T 3/00* (2006.01)
*B65G 69/00* (2006.01)

(52) U.S. Cl.
CPC .............. *B60T 3/00* (2013.01); *B65G 69/005* (2013.01)

(58) Field of Classification Search
CPC .................................. B60T 3/00; B65G 69/005
USPC ...................... 188/4 R, 5, 32; 410/30; 211/21
See application file for complete search history.

(56) References Cited

U.S. PATENT DOCUMENTS

| 385,526 | A | | 7/1888 | Russell | |
|---|---|---|---|---|---|
| 2,237,620 | A | * | 4/1941 | Doughty | B66F 3/005 |
| | | | | | 254/1 |
| 2,661,817 | A | * | 12/1953 | Mullins | B60T 3/00 |
| | | | | | 104/40 |
| 2,723,005 | A | * | 11/1955 | Wink | B60T 3/00 |
| | | | | | 188/32 |
| 3,221,907 | A | | 12/1965 | O'Sullivan | |
| 3,295,255 | A | * | 1/1967 | Russo | E01F 13/105 |
| | | | | | 188/32 |
| 3,425,517 | A | * | 2/1969 | Speir | E01F 13/08 |
| | | | | | 188/32 |
| 3,542,157 | A | * | 11/1970 | Noah | B60T 3/00 |
| | | | | | 188/32 |
| 3,871,492 | A | * | 3/1975 | Garrett | B60T 3/00 |
| | | | | | 188/32 |
| 5,664,930 | A | | 9/1997 | Ellis | |
| 6,589,003 | B2 | | 7/2003 | Berends | |
| 6,725,979 | B1 | | 4/2004 | Snook | |
| 6,755,599 | B1 | * | 6/2004 | Plyler | B60P 3/077 |
| | | | | | 211/21 |
| 8,696,272 | B1 | * | 4/2014 | Ragland | B60P 3/077 |
| | | | | | 410/19 |
| 8,887,874 | B2 | | 11/2014 | Bellota | |

FOREIGN PATENT DOCUMENTS

| FR | 2240128 A1 | * | 3/1975 | ............... B60T 3/00 |
|---|---|---|---|---|
| WO | WO2011110507 | | 9/2011 | |
| WO | WO-2014129940 A1 | * | 8/2014 | ............... B60T 3/00 |

* cited by examiner

*Primary Examiner* — Thomas J Williams

(57) ABSTRACT

A collapsible chock assembly for automatically chocking a vehicle tire includes a housing that is positioned in a well in a support surface thereby facilitating a vehicle to drive on the housing. A chock unit is provided and the chock unit is movably positioned in the housing. The chock unit is selectively positioned in a deployed position to abut a tire on the vehicle thereby inhibiting the vehicle from rolling. The chock unit is selectively positioned in a compressed position having the chock unit being recessed into the housing thereby allowing the vehicle to roll.

7 Claims, 4 Drawing Sheets

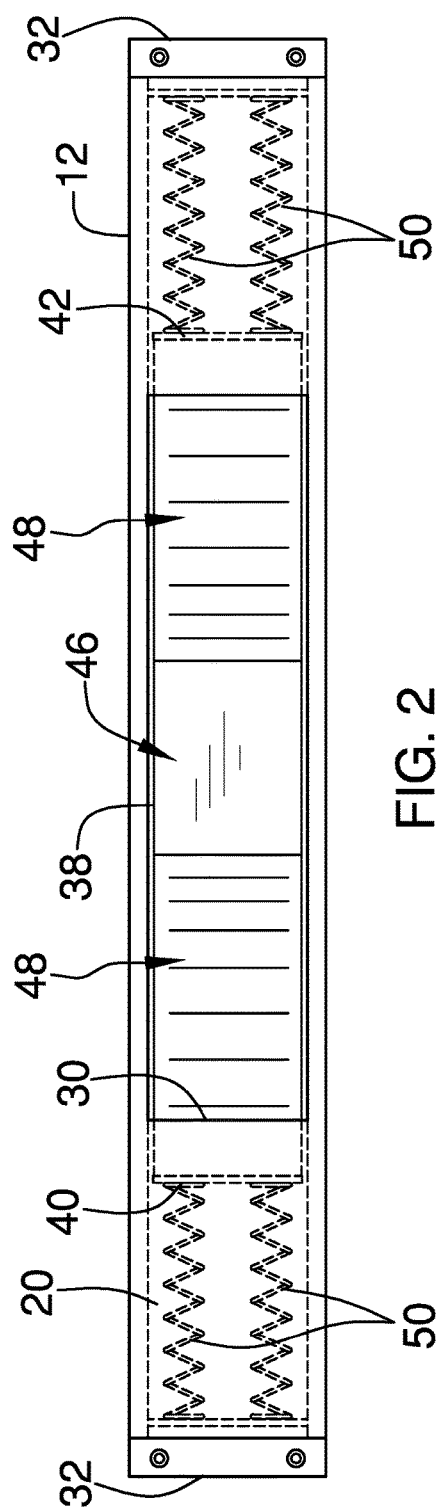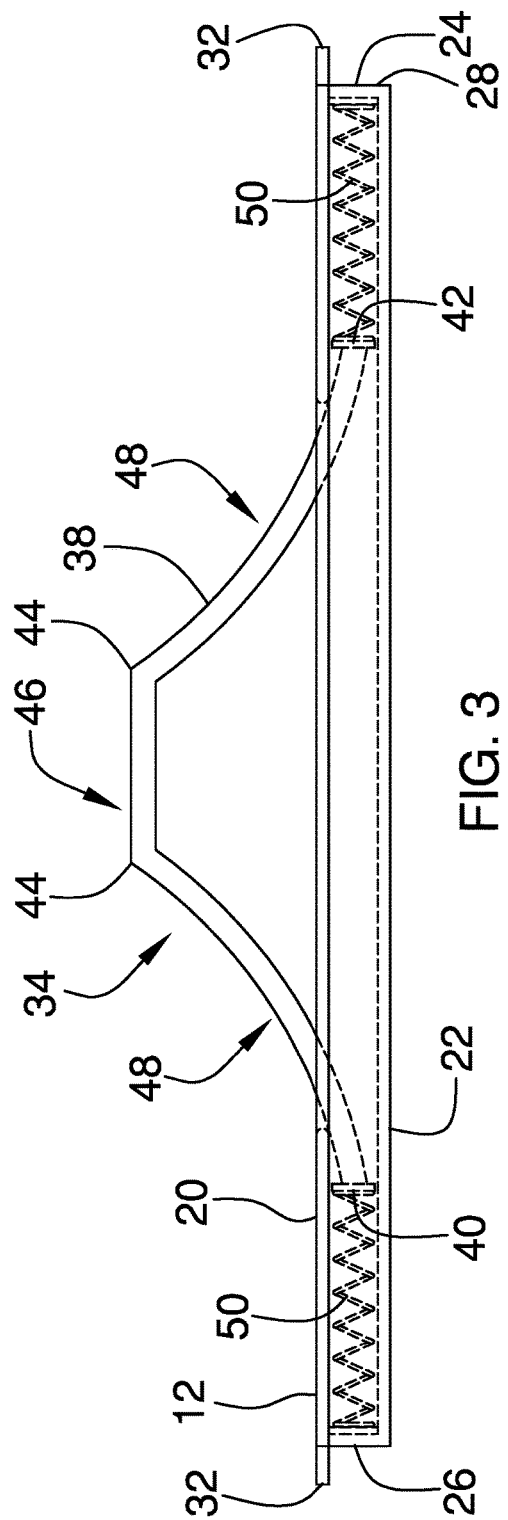

COLLAPSIBLE CHOCK ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION (1) Field of the Invention (2) Description of Related Art Including Information Disclosed Under 37 CFR 1.97 and 1.98

The disclosure and prior art relates to chock devices and more particularly pertains to a new chock device for automatically chocking a vehicle tire.

BRIEF SUMMARY OF THE INVENTION

An embodiment of the disclosure meets the needs presented above by generally comprising a housing that is positioned in a well in a support surface thereby facilitating a vehicle to drive on the housing. A chock unit is provided and the chock unit is movably positioned in the housing. The chock unit is selectively positioned in a deployed position to abut a tire on the vehicle thereby inhibiting the vehicle from rolling. The chock unit is selectively positioned in a compressed position having the chock unit being recessed into the housing thereby allowing the vehicle to roll.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a top phantom view of an embodiment of the disclosure.

FIG. 3 is a right side phantom view of an embodiment of the disclosure.

DETAILED DESCRIPTION OF THE INVENTION

Figure 1:
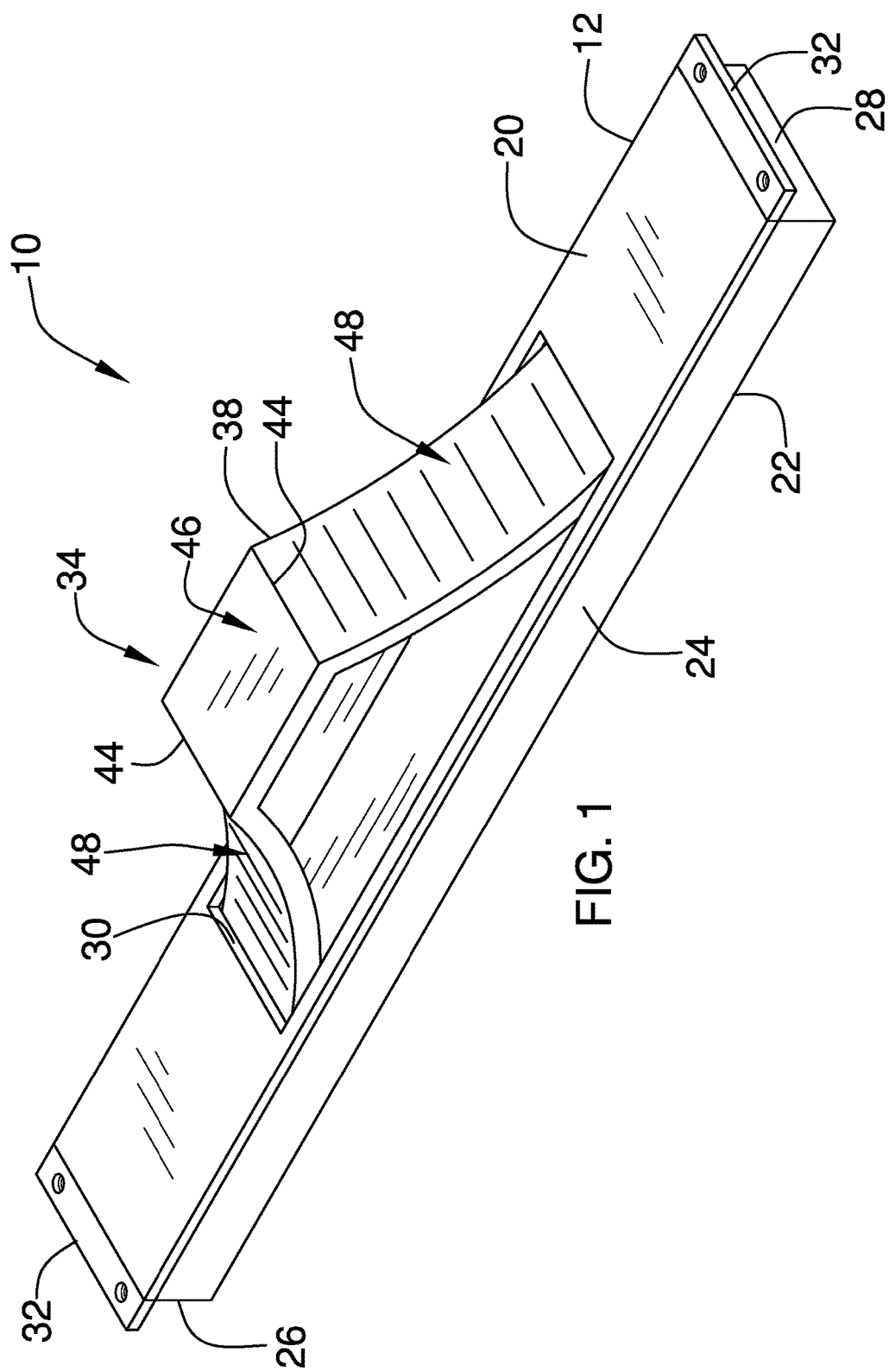
FIG. 1 is a top perspective view of a collapsible chock assembly according to an embodiment of the disclosure.
Figure 4:
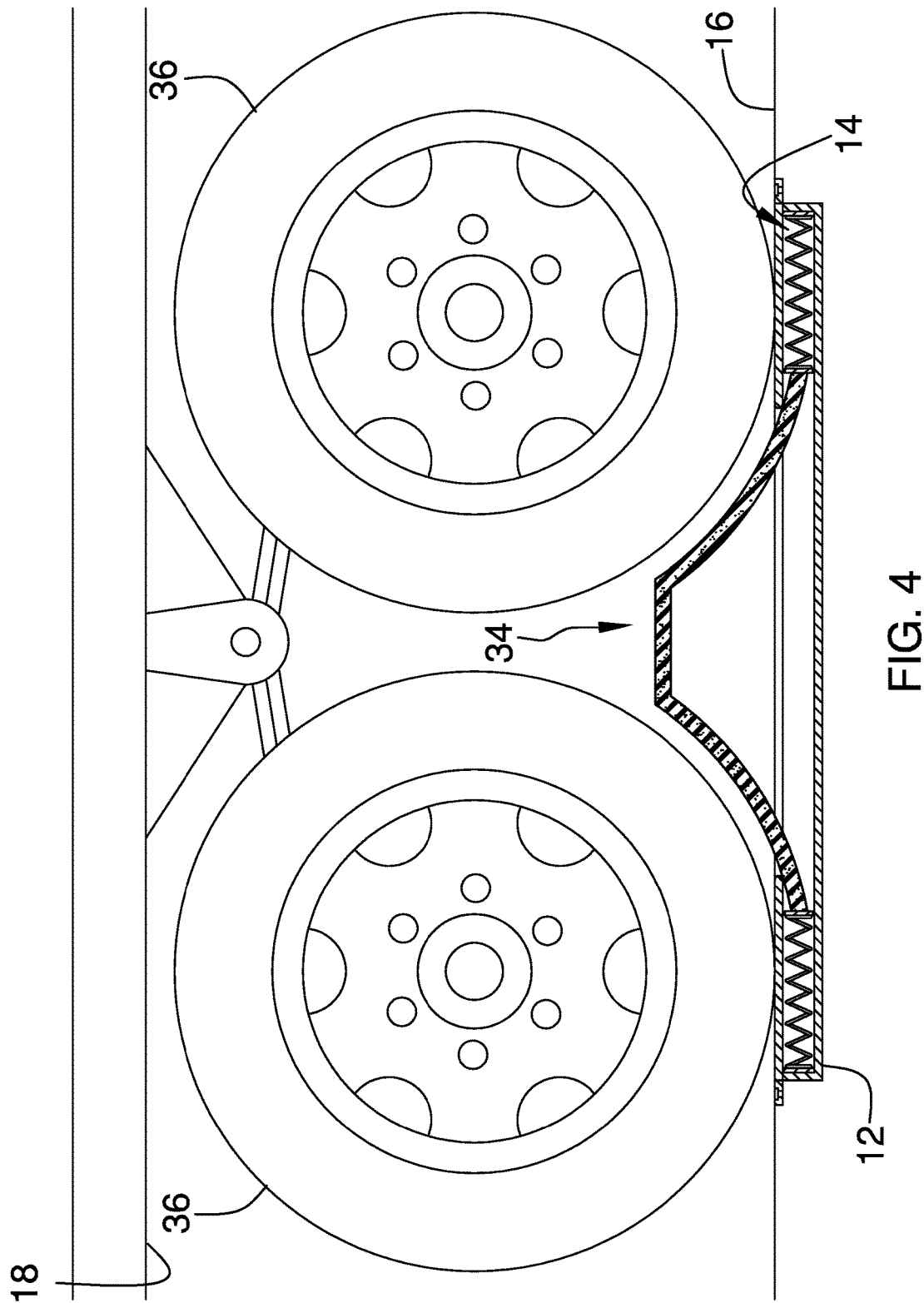
FIG. 4 is a cut-away in-use view of an embodiment of the disclosure showing a chock unit in a deployed position.
Figure 5:
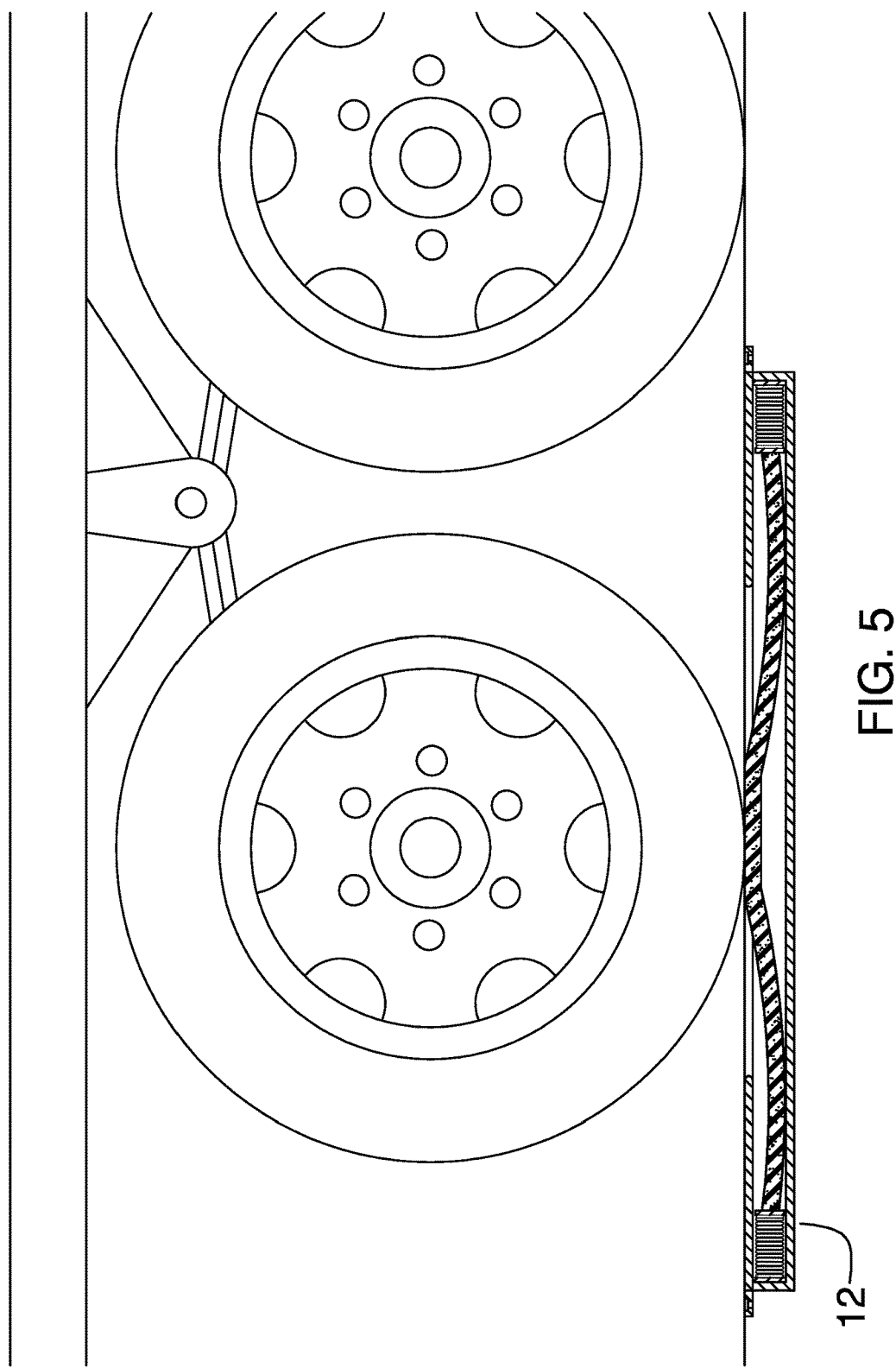
FIG. 5 is a cut-away in-use view of an embodiment of the disclosure showing a chock unit in compressed position.

With reference now to the drawings, and in particular to FIGS. 1 through 5 thereof, a new chock device embodying the principles and concepts of an embodiment of the disclosure and generally designated by the reference numeral 10 will be described.

As best illustrated in FIGS. 1 through 5, the collapsible chock assembly 10 generally comprises a housing 12 that is positioned in a well 14 in a support surface 16 thereby facilitating a vehicle 18 to drive on the housing 12. The support surface 16 may be ground and the well 14 may be a hole that has been dug in the ground. The vehicle 18 may be a cargo vehicle, a passenger vehicle and any other vehicle that has wheels and tires. Additionally, the housing 12 may be positioned near a loading dock at a commercial building or the like. The housing 12 has a top wall 20, a bottom wall 22 and an outer wall 24 extending therebetween. The outer wall 24 has a front side 26 and a back side 28 and the housing 12 is elongated between the front 26 and back 28 sides. The top wall 20 is aligned with the support surface 16 when the housing 12 is positioned in the well 14. The top wall 20 has an opening 30 extending into an interior of the housing 12 and the opening 30 extends substantially between the front 26 and back 28 sides of the housing 12.

A pair of tabs 32 is each coupled to and extends outwardly from the outer wall 24 of the housing 12. Each of the tabs 32 is aligned with the top wall 20 and each of the tabs 32 is positioned on an associated one of the front 26 and back 28 sides of the housing 12. Each of the tabs 32 abuts the support surface 16 when the housing 12 is positioned in the well 14. A plurality of fasteners is extended through each of the tabs 32 and engages the support surface 16. In this way the housing 12 is retained in the well 14 and each of the fasteners may comprise a screw or the like.

A chock unit 34 is provided and the chock unit 34 is movably positioned in the housing 12. The chock unit 34 is selectively positioned in a deployed position to abut a tire 36 on the vehicle 18 thereby inhibiting the vehicle 18 from rolling. The chock unit 34 is selectively positioned in a compressed position having the chock unit 34 being recessed into the housing 12. In this way the chock unit 34 allows the vehicle 18 to roll.

The chock unit 34 comprises a panel 38 that has a first end 40 and a second end 42. The panel 38 has a pair of bends 44 thereon and the bends 44 are spaced apart from each other to define a central portion 46 extending between a pair of end portions 48. The panel 38 is comprised of a resiliently bendable material such as rubber or the like and the panel 38 is positioned in the housing 12. Moreover, each of the first 40 and second 42 ends of the panel 38 is contained within the housing 12.

The panel 38 is positioned in a deployed position has each of the end portions 48 being concavely arcuate between the central portion 46 and an associated one of the first 40 and second 42 ends. Moreover, each of the end portions 48 extends upwardly through the opening 30 in the housing 12 and the central portion 46 is horizontally oriented between the end portions 48 when the panel 38 is positioned in the deployed position. Thus, the tire 36 abuts a selected one of the end portions 48 when said vehicle 18 is rolled against the panel 38. In this way the panel 38 inhibits the vehicle 18 from rolling. The panel 38 may have a bending strength ranging between approximately 45.0 kg and 90.0 kg such that the panel 38 resists bending when the vehicle's engine is not running. In this way the panel 38 inhibits the vehicle 18 from rolling when the vehicle 18 is parked. The panel 38 is positioned in a compressed position having the central portion 46 being aligned with the top wall 20 of the housing 12. In this way the vehicle 18 may drive over the panel 38 when the vehicle 18 is being powered by the engine.

A plurality of biasing members 50 is provided and each of the biasing members 50 is positioned within the housing 12. Each of the biasing members 50 extends between an associated one of the first 40 and second 42 ends of the panel 38 and an associated one of the front 26 and back 28 sides of the housing 12. Moreover, each of the biasing members 50 biases the panel 38 into the deployed position. Each of the biasing members 50 may comprise a spring or the like.

In use, the housing 12 is positioned in the well 14 and the vehicle 18 drives over the panel 38 when the vehicle 18 is approaching the loading dock or the like. The panel 38 is compressed into the housing 12 when the vehicle 18 drives over the panel 38. The plurality of biasing members 50 biases the panel 38 into the deployed position when the vehicle 18 is not resting on the panel 38. The vehicle 18 is allowed to roll against the panel 38 when the vehicle 18 is being parked. Thus, selected ones of the tires 36 on the vehicle 18 abuts a corresponding one of the end portions 48 of the panel 38. In this way the panel 38 inhibits the vehicle 18 from rolling when the vehicle 18 is parked. Moreover, the vehicle 18 is chocked without requiring a driver of the vehicle 18 to exit the vehicle 18. The vehicle 18 is selectively driven over the panel 38 when the vehicle is departing. The tire 36 rolls over the panel 38 thereby urging the panel 38 into the compressed position.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

We claim:

1. A collapsible chock assembly being configured to selectively inhibit a vehicle from moving, said assembly comprising:
    a housing being configured to be positioned in a well in a support surface thereby facilitating a vehicle to drive on said housing;
    a chock unit being movably positioned in said housing, said chock unit being selectively positioned in a deployed position wherein said chock unit is configured to abut a tire on the vehicle thereby inhibiting the vehicle from rolling, said chock unit being selectively positioned in a compressed position having said chock unit being recessed into said housing wherein said chock unit is configured to allow the vehicle to roll; and
    wherein said chock unit comprises a panel having a first end and a second end, said panel having a pair of bends thereon, said bends being spaced apart from each other to define a central portion extending between a pair of end portions, said panel being comprised of a resiliently bendable material.

2. The assembly according to claim 1, wherein said housing has a top wall, a bottom wall and an outer wall extending therebetween, said outer wall having a front side and a back side, said housing being elongated between said front and back sides, said top wall being configured to be aligned with the support surface, said top wall having an opening extending into an interior of said housing, said opening extending substantially between said front and back sides of said housing.

3. The assembly according to claim 2, further comprising a pair of tabs, each of said tabs being coupled to and extending outwardly from said outer wall of said housing, each of said tabs being aligned with said top wall, each of said tabs being positioned on an associated one of said front and back sides wherein each of said tabs is configured to abut the support surface when said housing is positioned in the well.

4. The assembly according to claim 1, wherein:
    said housing has a top wall, said top wall having an opening; and
    said panel is positioned in a deployed position having each of said end portions being concavely arcuate between said central portion and an associated one of said first and second ends, said panel being positioned in said housing having said each of said end portions extending upwardly through said opening in said housing and having said central portion being horizontally oriented between said end portions wherein each of said end portions is configured to abut the tire.

5. The assembly according to claim 4, wherein said panel is positioned in a compressed position having said central portion being aligned with said top wall of said housing wherein said panel is configured to facilitate the vehicle to roll.

6. The assembly according to claim 1, wherein:
    said housing has a front end and a back end; and
    said chock unit includes a plurality of biasing members, each of said biasing members being positioned within said housing, each of said biasing members extending between an associated one of said first and second ends of said panel and an associated one of said front and back sides of said housing, each of said biasing members biasing said panel into said deployed position.

7. A collapsible chock assembly being configured to selectively inhibit a vehicle from moving, said assembly comprising:
- a housing being configured to be positioned in a well in a support surface thereby facilitating a vehicle to drive on said housing, said housing having a top wall, a bottom wall and an outer wall extending therebetween, said outer wall having a front side and a back side, said housing being elongated between said front and back sides, said top wall being configured to be aligned with the support surface, said top wall having an opening extending into an interior of said housing, said opening extending substantially between said front and back sides of said housing;
- a pair of tabs, each of said tabs being coupled to and extending outwardly from said outer wall of said housing, each of said tabs being aligned with said top wall, each of said tabs being positioned on an associated one of said front and back sides of said wherein each of said tabs is configured to abut the support surface when said housing is positioned in the well; and
- a chock unit being movably positioned in said housing, said chock unit being selectively positioned in a deployed position wherein said chock unit is configured to abut a tire on the vehicle thereby inhibiting the vehicle from rolling, said chock unit being selectively positioned in a compressed position having said chock unit being recessed into said housing wherein said chock unit is configured to allow the vehicle to roll, said chock unit comprising:
- a panel having a first end and a second end, said panel having a pair of bends thereon, said bends being spaced apart from each other to define a central portion extending between a pair of end portions, said panel being comprised of a resiliently bendable material, said panel being positioned in a deployed position having each of said end portions being concavely arcuate between said central portion and an associated one of said first and second ends, said panel being positioned in said housing having said each of said end portions extending upwardly through said opening in said housing and having said central portion being horizontally oriented between said end portions wherein each of said end portions is configured to abut the tire, said panel being positioned in a compressed position having said central portion being aligned with said top wall of said housing wherein said panel is configured to facilitate the vehicle to roll, and
- a plurality of biasing members, each of said biasing members being positioned within said housing, each of said biasing members extending between an associated one of said first and second ends of said panel and an associated one of said front and back sides of said housing, each of said biasing members biasing said panel into said deployed position.

\* \* \* \* \*